Sept. 16, 1958  B. G. HORSTMANN ET AL  2,852,050
UNIVERSAL WOODWORKING MACHINE
Filed April 16, 1956  2 Sheets-Sheet 1
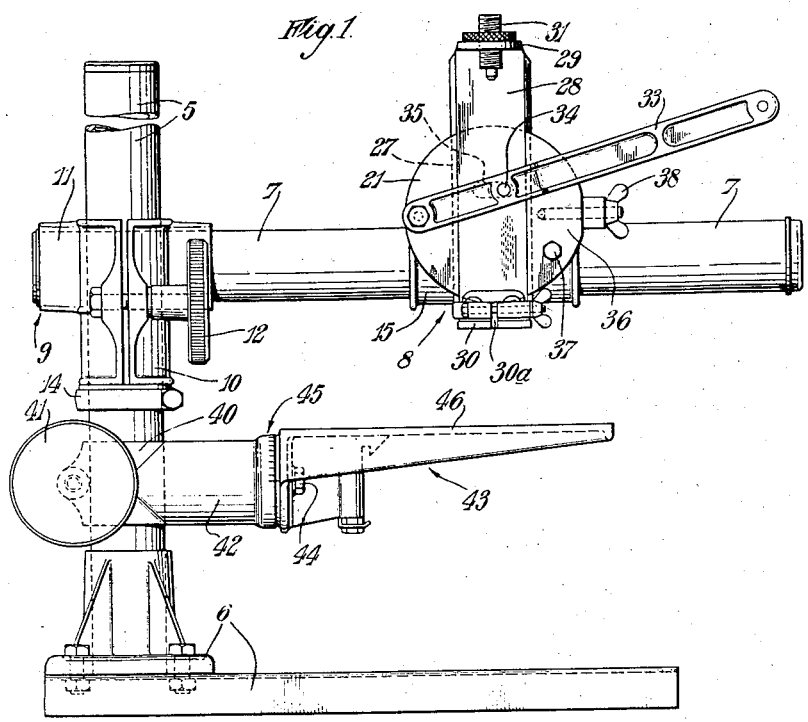
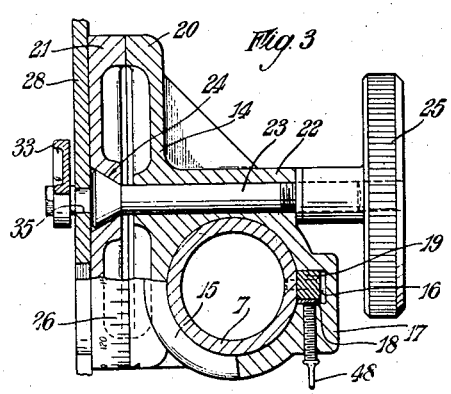
INVENTORS
BEVAN G. HORSTMANN
THEO SHERWEN
BY Emory L. Groff
Atty Sept. 16, 1958     B. G. HORSTMANN ET AL     2,852,050
UNIVERSAL WOODWORKING MACHINE
Filed April 16, 1956     2 Sheets-Sheet 2
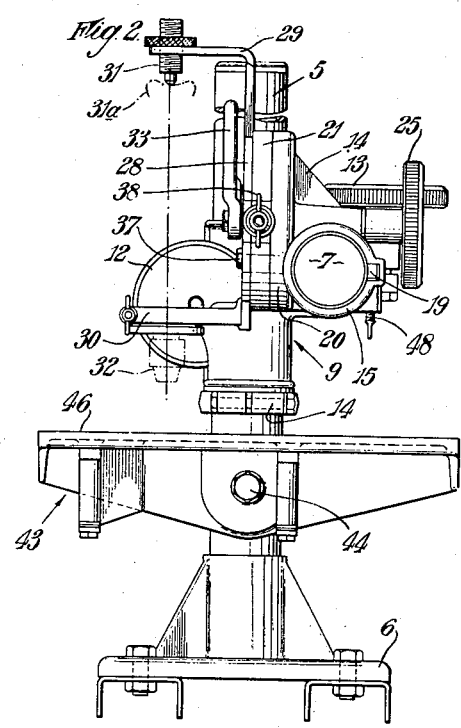
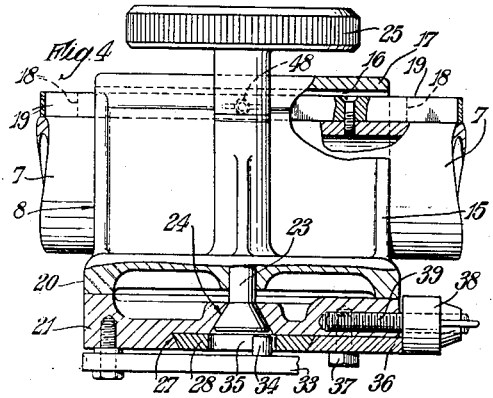
INVENTORS
BEVAN G. HORSTMANN
THEO SHERWEN
BY Emery L. Groff
Atty.

2,852,050

UNIVERSAL WOODWORKING MACHINE

Bevan Graham Horstmann, Bath, and Theo Sherwen, Nailsworth, Gloucester, England

Application April 16, 1956, Serial No. 578,264

Claims priority, application Great Britain April 25, 1955

2 Claims. (Cl. 144—134)

This invention relates to a woodworking machine which is univerasl in the sense that it can be adapted for use in several woodworking operations which can be carried out with a rotatory tool. Thus a machine constructed according to the invention can be employed for such diverse jobs as rip sawing, angle cutting, drilling, routing and so forth. It will be understood that although the primary purpose of the invention is for woodworking, nevertheless the machine can be employed for certain classes of metal work such as drilling, grinding, polishing and the like.

A machine according to the invention is of a comparatively small lightweight type with a self-contained electric motor and capable of being secured to a workbench for use in a home workshop.

According to the invention the machine comprises a vertical pillar, a beam carried cantileverwise from the pillar and mounted for rotation about its own longitudinal axis, means for clamping the beam in a selected position, a carriage carried by the beam for movement therewith and slidable along the beam, and a carrier for the work-performing tools slidably mounted on the carriage and rotatable thereon about an axis normal to said long axis. The tool can thus be adjustably fixed at any desired point along the beam, and by partially rotating the beam the axis of the tool can be turned to any selected angle from the horizontal to the vertical and, in a preferred embodiment, by bodily swinging the beam about the pillar a further variety of tool positions can be attained.

A practical application of the invention will now be described, by way of example only, with reference to the accompanying drawings whereof:

Figure 1 is a side view of a machine according to the invention;

Figure 2 is an end view of the machine looking from the right of Figure 1;

Figure 3 is a part-sectional view, to a larger size, of the beam and the carriage thereon of the machine of Figure 1; and Figure 4 is a part-sectional plan view of the assembly shown in Figure 3.

Like numerals of reference indicate the same or corresponding parts in the several views.

Referring to the drawings: there is mounted upon a vertical pillar 5 supported on a suitable bed 6 a horizontal cylindrical beam 7 which projects therefrom as a cantilever and carries a carriage 8 adapted to be clamped in any suitable position along the beam. The beam 7 is rotatably mounted about its longitudinal axis in a pillar bracket 9 slidable up and down the pillar 5 by which means the beam can be raised and lowered in relation to the bed 6 and also can be rotatably adjusted in the said bracket. The bracket 9 is arranged to turn on the pillar about the vertical axis of the pillar and to be clamped in any requisite position and thus the beam can assume different angular positions around the pillar while being capable of the aforesaid rotational movement in the bracket. The bracket 9 may be marked with graduations registering with an indicating mark on the pillar or vice versa so that the angle of the beam when it is swung around the pillar in respect to a given datum line, may be readily determined. Similarly the beam, which is preferably in the form of a tube, may be marked with graduations where it enters the pillar bracket and such graduations may be read against a datum line on the bracket or vice versa; thus when the beam is partially rotated for canting the carriage 8 and the axis of a tool carried thereby (as later described) the exact angle of cant in a vertical plane can be determined. The pillar bracket 9 is a unit comprising a pair of tubular sockets, one (indicated at 10) for the pillar and one (shown at 11) for the tubular beam, each socket being longitudinally split for clamping and having lugs to take a clamping screw 12 and 13 respectively. A separate collar 14 is adjustably mounted on the pillar underneath the pillar bracket 9, and adapted to be locked in a requisite position, so as to support the bracket when the latter is left free for rotation on the pillar.

The carriage 8 comprises (see particularly Figures 3 and 4) a main head casting 14 including a tubular body 15 to slide along the beam, said body being longitudinally slotted interiorly at 16 on one side to engage a key 19 on the beam 7. The casting 14 is held in position on the beam 7 by a screw 48 (Figures 2 and 4) which bears against a gib or wedge key 18 lying in the slot 16 under and against the beam key 19.

Formed with the tubular body 15 is a circular face plate 20 to which is detachably secured a carrier-receiving plate 21. For securing the latter plate to the face plate a boss 22 is provided across the tubular body from the face plate through which a conical headed screw 23 may be passed, through registering holes in both plates, the carrier-receiving plate having a conical recess 24 to house the bolt head. By tightening a knurled nut 25 on the bolt, the carrier-receiving plate 21 may be clamped tightly against the face plate 20. It will be clear that the carrier-receiving plate can thus be angularly adjusted in swivel fashion on the face plate about the bolt axis, and locked in any desired position. A scale of angles 26 is provided around the periphery of the plate 21 which is read against a datum line on the face plate or vice versa.

The plate 21 is formed with an undercut groove 27 to receive a carrier slide 28 for a self-contained electrically driven tool holder. For example the carrier may be in the form of a slide 28 having upper and lower out-turned flanges 29, 30 (Figure 2), the whole being of squat U-shape. Flange 29 is provided with a screw 31 with a gripping point and the other flange 30 is formed with a circular hole, and is split radially of the hole so that it can grip a self-contained combined motor and tool, part 31a of which is indicated, with the chuck end 32 of the tool projecting outside the flange 30. The latter is split at 30a to enable the chuck end to be gripped in an aperture in the flange 30. Interchangeable carriers with different motor gripping arrangements may be used.

The said carrier slide 28 can be moved slidingly on the plate 21, as required for drilling and other axial-feed operations, and for this purpose a feed lever 33 is pivoted to the plate and lies across the carrier slide, and a pin 34 carried by the lever engages a slot 35 in the slide.

The slide 28 moves between the undercut 27 and a sector plate 36 pivotally secured by a bolt 37 to plate 21. The sector 36 projects beyond plate 21 (see Figure 4) and the projecting edge is engaged by a wing nut 38 mounted on a stud 39 carried by plate 21. Consequently when nut 38 is drawn up the sector 36 is urged against slide 28 to clamp the latter against movement. In this way the motor-tool 31 can be held in any required vertical position.

The pillar 5 carries a bracket 40 which may be clamped to the pillar in known manner by tightening the handwheel 41. When the handwheel 41 is loose the bracket may be adjusted vertically and turned around the pillar. The bracket carries an arm 42 cantileverwise from the pillar, a work table 43 being mounted on arm 42, the table being bolted to the arm, at 44. When the fixing at 44 is released the table may be adjusted angularly about a horizontal axis, the attachment of the table to the arm permitting this. The angular adjustment may be determined by a scale of angles, generally indicated at 45. The table 43 comprises a top 46 which may be removed from the table carrier arm 42 and replaced by another top to suit a particular machining operation.

We claim:

1. A wood or metal working machine comprising a vertical cylindrical pillar, a cylindrical beam carried cantileverwise from the pillar, a bracket slidable up and down and rotatable around the pillar by means of a first contractible sleeve embracing the pillar and lockable thereon, said bracket being integrally made with a second contractible sleeve in which the beam is fitted so as to rotate therein, means for locking the beam in the second sleeve, a carriage including a tubular body slidably mounted and lockable on the beam, means to prevent rotation of the tubular body on the beam, and a plate mounted on said carriage to rotate on an axis at right-angles to the axis of the beam, an undercut groove on said plate to receive the slide of a tool carrier to enable the carrier to slide across said plate, and out-turned flanges to said slide provided with means to grip a tool between them.

2. A wood or metal working machine according to claim 1 in which the plate on which the tool carrier slide is mounted is provided with means for locking the slide in an adjusted position, or for leaving it free for a sliding operation, and a feed lever is pivoted to the plate and is interconnected with the slide to reciprocate it on the plate.

References Cited in the file of this patent

UNITED STATES PATENTS

| | | |
|---|---|---|
| 547,215 | Jaimison et al. | Oct. 5, 1895 |
| 595,850 | Flickinger | Dec. 21, 1897 |
| 672,284 | Nuttall | Apr. 16, 1901 |
| 1,242,775 | Curtis | Oct. 9, 1917 |
| 1,738,763 | DeWalt | Dec. 10, 1929 |
| 1,748,446 | Gatzsch | Feb. 25, 1930 |
| 1,852,387 | Wieden | Apr. 5, 1932 |
| 2,022,289 | Knapp | Nov. 26, 1935 |
| 2,260,635 | Musselman | Oct. 28, 1941 |